US012763485B1

(12) United States Patent
Rohde

(10) Patent No.: US 12,763,485 B1
(45) Date of Patent: Oct. 13, 2026

(54) HYBRID ARTIFICIAL MAGNETIC CONDUCTOR ANTENNA REFLECTOR TECHNOLOGY

(71) Applicant: The United States of America Represented by the Secretary of the Navy, Indian Head, MD (US)

(72) Inventor: David Rohde, Indian Head, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 21 days.

(21) Appl. No.: 18/938,610

(22) Filed: Nov. 6, 2024

(51) Int. Cl.
*H01Q 15/16* (2006.01)
*H01Q 1/36* (2006.01)
*H01Q 21/06* (2006.01)

(52) U.S. Cl.
CPC ............. *H01Q 15/167* (2013.01); *H01Q 1/36* (2013.01); *H01Q 21/065* (2013.01)

(58) Field of Classification Search
CPC ....... H01Q 15/167; H01Q 1/36; H01Q 21/065
See application file for complete search history.

(56) References Cited

U.S. PATENT DOCUMENTS 7,629,942 B2 12/2009 Kato
8,928,544 B2 1/2015 Massie et al.
9,583,839 B2 2/2017 Liu et al.
10,601,141 B2 3/2020 Kawata
10,826,180 B2 11/2020 Hong et al.
10,854,994 B2 12/2020 Niroo Jazi et al.
11,271,319 B2 * 3/2022 Celik ..................... H01Q 1/247
2016/0190704 A1 * 6/2016 Celik .................. H01Q 9/0428
343/700 MS

FOREIGN PATENT DOCUMENTS

CN 109802231 2/2024

OTHER PUBLICATIONS

Qingchong Liu, Hui Liu, Wang He, and Sailing He, "A Low-Profile Dual-Band Dual-Polarized Antenna with an AMC Reflector for 5G Communications", IEEE Access, vol. XX, 2017.

* cited by examiner

*Primary Examiner* — David E Lotter
(74) *Attorney, Agent, or Firm* — Fredric J. Zimmerman

(57) ABSTRACT

A Hybrid Artificial Magnetic Conductor (AMC) antenna reflector improves performance of an Archimedean spiral antenna across all bands. The AMC reflector provides uni-directional radiation over a 1-5 GHz frequency range. The AMC reflector provides at least 3 dB of gain compared to the same antenna without a reflector. The AMC reflector includes a traditional Perfect Electric Conductor (PEC) reflector portion, used to reflect higher frequencies, and a capacitively loaded AMC reflector portion, used to reflect lower frequencies. The AMC patch size and capacitor values are optimized for best response across the 1-2 GHz frequency range. The center, high frequency section of the AMC reflector portion is removed to provide an optimized standoff distance from the antenna to allow direct reflection from the PEC reflector portion. The AMC reflector reduces the PEC reflector thickness dimension and provides improved antenna pattern symmetry at higher frequencies.

20 Claims, 8 Drawing Sheets

HYBRID ARTIFICIAL MAGNETIC CONDUCTOR ANTENNA REFLECTOR TECHNOLOGY

STATEMENT OF GOVERNMENT INTEREST

The invention described herein was made in the performance of official duties by employees of the U.S. Department of the Navy and may be manufactured, used, or licensed by or for the Government of the United States for any governmental purpose without payment of any royalties thereon.

BACKGROUND OF THE INVENTION

Field of the Invention

The present invention relates to antenna reflector surfaces, and in particular, to hybrid antenna reflectors combining a perfect electric conductor (PEC) reflector with an artificial magnetic conductor (AMC) reflector.

Description of the Prior Art

Electromagnetic reflection is the process of a surface throwing back electromagnetic (EM) radiation that hits it. The principle of reflection is used to design antennas that focus electromagnetic energy towards a single direction. A reflection plate typically has a surface as the boundary between two materials with different electromagnetic properties, such as air and copper. The reflection plate is used to reflect the electromagnetic wave to improve the gain of the antenna in the intended direction of radiation.

Perfect Electric Conductor (PEC) antenna reflectors perform best when the reflector is placed at a distance of $\lambda/4$ from the antenna ($\lambda$ is the wavelength of the electromagnetic wave that is used). Since a PEC surface results in a 180° phase shift of electromagnetic waves, the reflector must be located at that distance so that constructive interference can take place. For lower frequencies, this configuration can result in a large distance between the antenna and the antenna reflector. Additionally, for wideband devices, degraded performance is experienced away from the center frequency.

An alternative to a PEC reflector is an Artificial Magnetic Conductor (AMC). An AMC approximates the properties of a Perfect Magnetic Conductor (PMC), and since a PMC does not cause a 180° phase shift, the reflector may be placed at a minimal distance from the antenna resulting in a more compact structure. The AMC reflector also has bandwidth limitations so wideband antenna applications can experience similar degraded performance.

There remains a need for an antenna with both PEC and PMC reflector surfaces to achieve a wideband reflector with reduced thickness while optimizing the gain of the antenna across the desired frequency band.

SUMMARY OF THE INVENTION

The invention disclosed herein provides a Hybrid Artificial Magnetic Conductor (AMC) reflector that improves performance of an Archimedean spiral antenna across all bands. The Archimedean spiral antenna uses the hybrid AMC reflector to provide uni-directional radiation over a 1-5 GHz frequency range. The hybrid AMC reflector provides at least 3 dB of gain in a single direction compared to the same antenna without a reflector. The hybrid AMC reflector also reduces the PEC reflector thickness dimension ($\lambda/4$) and provides improved antenna pattern symmetry at higher frequencies. The hybrid AMC reflector includes a traditional PEC reflector portion, used to reflect higher frequencies, and a capacitively loaded AMC reflector portion, used to reflect lower frequencies. The center, high frequency section of the AMC reflector portion is removed to provide an optimized standoff distance from the antenna to allow direct reflection from the PEC reflector portion. The AMC patch size and capacitor values are optimized for best response across the 1-2 GHz frequency range.

According to an aspect of the invention, an antenna includes a substrate, a feed element, and a radiating element coupled to the feed element. The radiating element is substantially parallel to the substrate. The substrate is made up of a dielectric material with an attached ground plane reflector. The artificial magnetic conductor reflector is attached to a substrate and is between the radiating element and the ground plane reflector. The artificial magnetic conductor reflector has a central portion removed to allow direct reflection for the radiating element from the ground plane reflector.

According to another aspect of the invention, an antenna reflector surface is provided. The antenna reflector surface includes a ground plane and an artificial magnetic conductor surface. The artificial magnetic conductor surface is made up of a plurality of rectangular patches, a portion of which are capacitively loaded and located around the central portion of the artificial magnetic conductor.

BRIEF DESCRIPTION OF THE DRAWINGS

These and other objects, features and advantages of the present invention will become apparent upon reference to the following description of the exemplary embodiments and to the drawings, wherein corresponding reference characters indicate corresponding parts throughout the several views of the drawings and wherein.

DETAILED DESCRIPTION OF THE INVENTION

Figure 1:
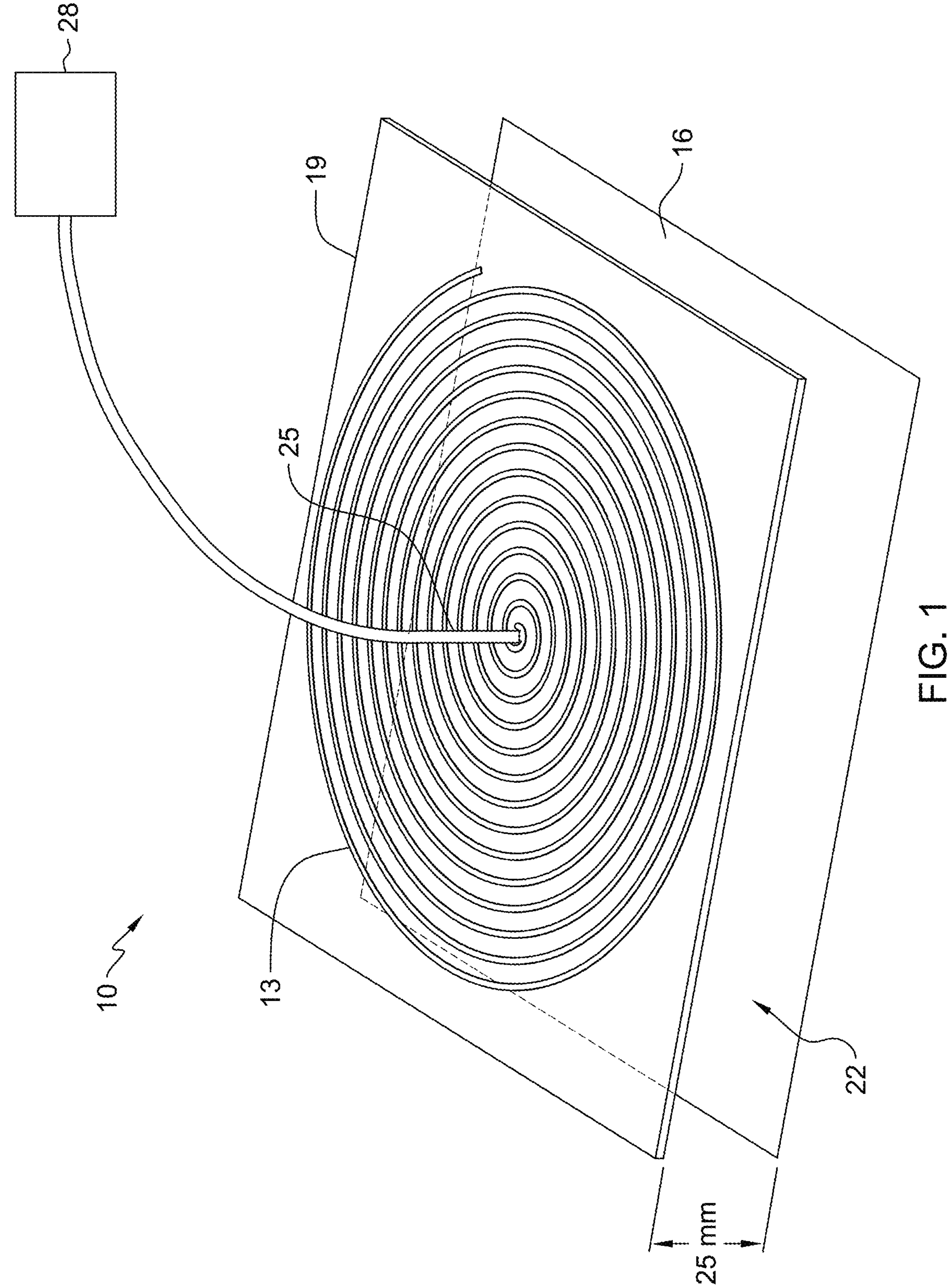
FIG. 1 is a perspective view of a spiral antenna and reflector.

Referring to the drawings, FIG. 1 shows an antenna indicated generally as 10, which includes a radiating element 13 and a reflector 16. The reflector 16 is sometimes referred to as a ground plane. Radiating element 13 is shaped as an Archimedean spiral shape. Such antenna 10 is usually called an Archimedean spiral antenna. An Archimedean spiral antenna is a planar, frequency independent antenna that can operate in a frequency range of 1-5 GHz, or more.

The frequency is based on the radius of the radiating element 13: r=λ/2π. The radiating element 13 may be printed on a foundation 19 such that the radiating element 13 is substantially parallel to the reflector 16. As shown in FIG. 1, the reflector 16 may be a traditional Perfect Electric Conductor (PEC) reflector having a copper conductive surface. The gap 22 between the radiating element 13 and reflector 16 is set at a distance of λ/4 from the antenna, which for 3 GHz is 25 mm. A well performing reflector should provide at least 3 db of additional gain in the intended direction of radiation. Experimentally, a PEC reflector performs very well at lower frequencies obtaining gain values above 3 db, but does not perform as well at higher frequencies which have gain values below 3 db The antenna 10 includes a feed element 25 attached to the radiating element 13. The feed element 25 is operatively connected to a transmitter 28. The feed element 25 may be attached to the radiating element 13 from above, as shown in FIG. 1. In some cases, the feed element 25 may go through the reflector 16 and attach to the radiating element 13 from below.

Figure 2:
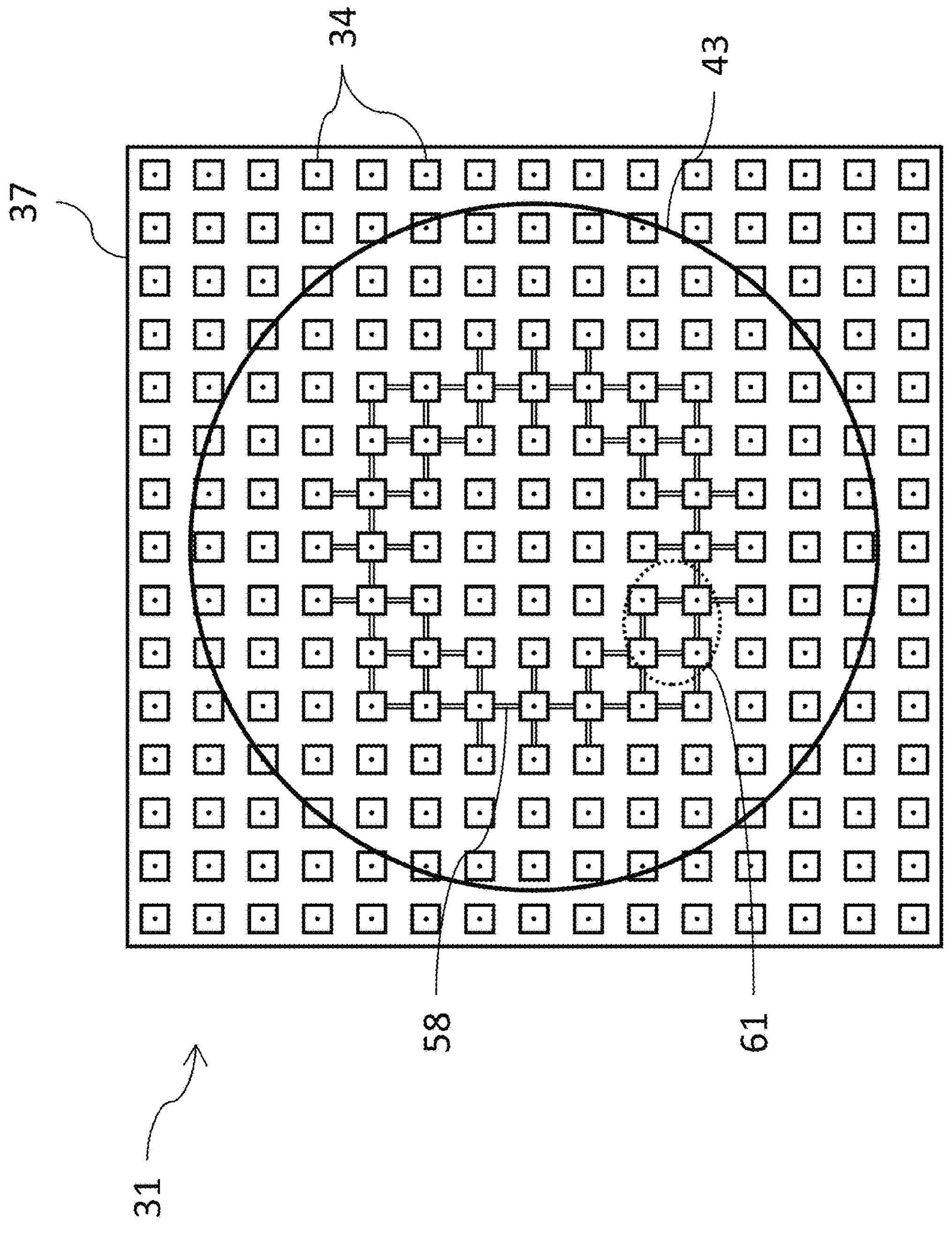
FIG. 2 is a plan view of an Artificial Magnetic Conductor (AMC) reflector according to devices herein.

FIG. 2 shows an Artificial Magnetic Conductor (AMC) reflector 31. The AMC reflector 31 is made up of a plurality of patches 34 mounted on substrate 37. As would be known to one of ordinary skill in the art, an AMC patch is a small metallic structure that behaves like a magnetic conductor when illuminated by electromagnetic waves. As shown in FIG. 2, the patches 34 are square and distributed in a uniform pattern on the substrate 37. While other shapes may be used, AMC reflectors generally have a symmetric array of geometric patterns, sized to λ/10 or smaller. The substrate 37 is a dielectric material, which is mounted on a ground plane reflector 40 that serves, in part, as a PEC reflector, as further described below. As shown in FIG. 2, circle 43 represents the diameter of the radiating element 13.

Figure 3:
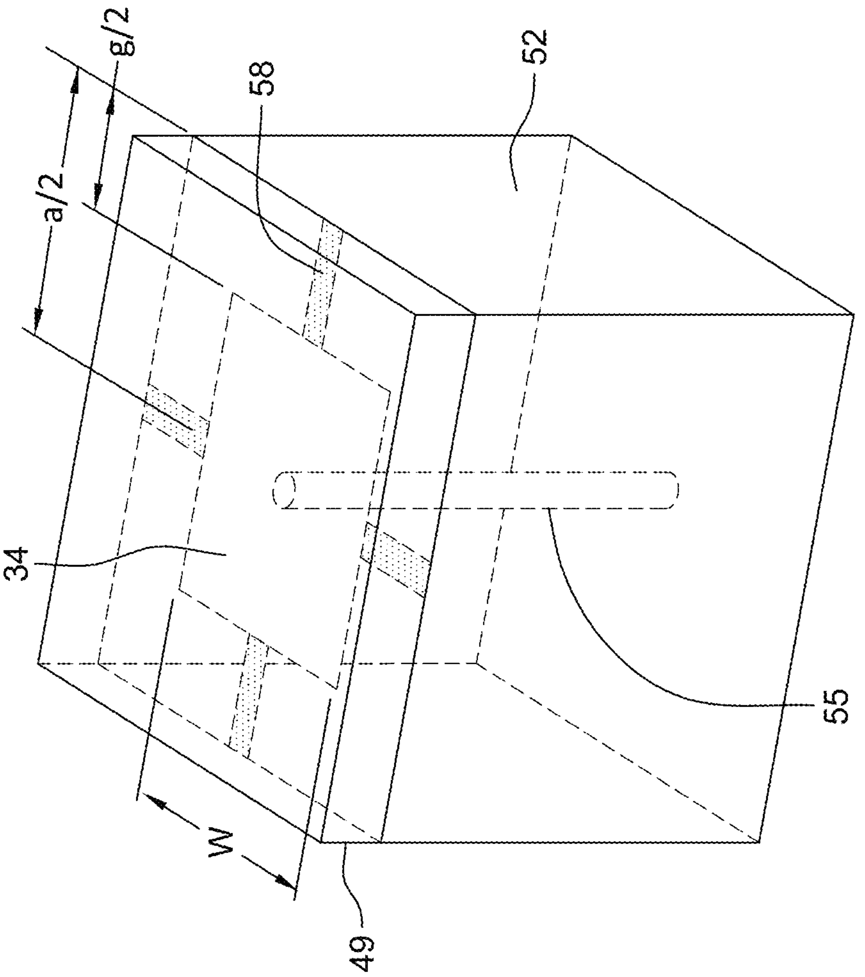
FIG. 3 is a perspective view of a single patch cell according to devices herein.
Figure 4:
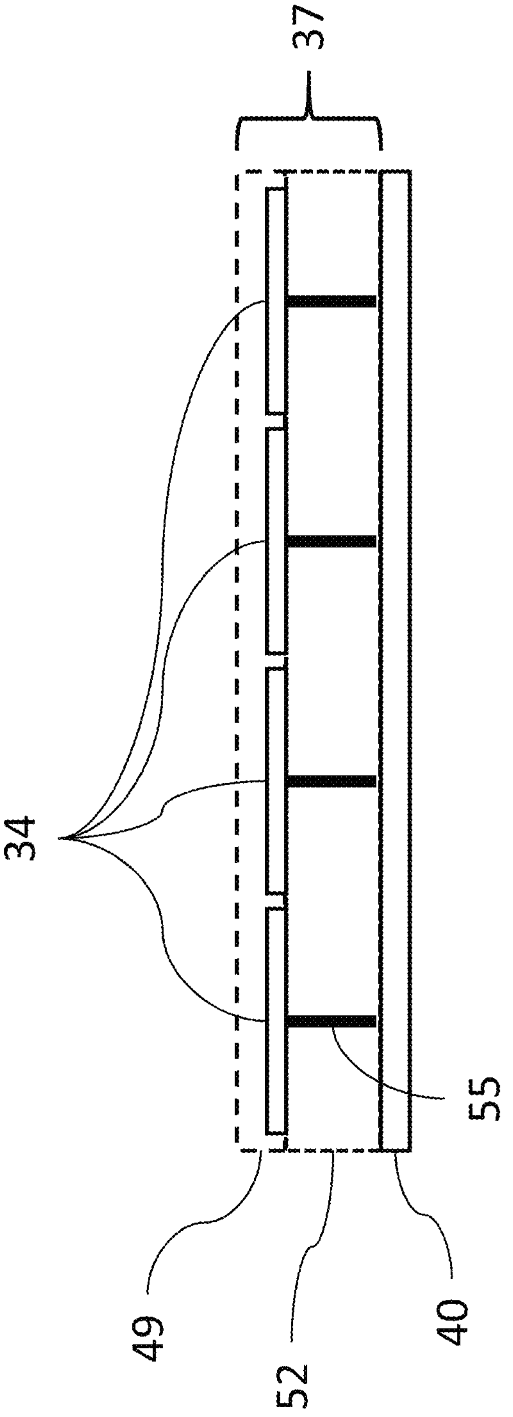
FIG. 4 is a side view of an AMC reflector according to devices herein.

FIG. 3 is a perspective view of a single cell 46 for the AMC reflector 31. The patches 34 are formed on a substrate 37 made up of a top layer 49 and a laminate structure 52. The top layer 49 may be a FR4 layer. FR4 is a composite material composed of woven fiberglass cloth with an epoxy resin binder. Other materials may be used for the top layer 49. The top layer 49 may be approximately 4 mm thick, having a permittivity, $\epsilon_1$ of approximately 4.4. The top layer 49 is formed on the laminate structure 52. The laminate structure 52 may be, for example, a Rogers RT/Duroid® 6180 laminate. Other materials may be used for the laminate structure 52. The laminate structure 52 may be approximately 9 mm thick, having a permittivity, $\epsilon_2$ of approximately 2.2. A ground plane reflector 40 is connected to the bottom of the laminate structure 52. Each patch 34 is connected to the ground plane reflector 40 by vias 55, such as shown in FIG. 4. In some embodiments, the top layer 49 is separated from the radiating element 13 by 1 mm to alleviate coupling, resulting in a total reflector thickness of 14 mm.

The percentage bandwidth of the AMC reflector 31 is related to the sheet capacitance and inductance as follows:

$$\frac{\Delta\omega}{\omega} = \sqrt{\frac{L}{C}} \quad [1]$$

Maximum bandwidth is achieved by maximizing inductance, L, and minimizing capacitance, C. The inductance of the AMC reflector 31 is related to the combined thickness of the substrate 37, as follows:

$$L = \mu_1 h \quad [2]$$

The capacitance is related to the surface geometry and the permittivity, $\epsilon_r$, of the AMC reflector 31, as follows:

$$C = \frac{w(\epsilon_1 + \epsilon_2)}{\pi} + \cosh^{-1}\left(\frac{a}{g}\right) \quad [3]$$

Each patch 34 is approximately (about) 9 mm×9 mm and each cell is approximately (about) 15 mm×15 mm. Therefore, as shown in FIG. 3, w may be approximately 4.5 mm, a may be approximately 15 mm, and g may be approximately 6 mm. Multiple substrates may be used to optimize capacitance.

Figure 5:
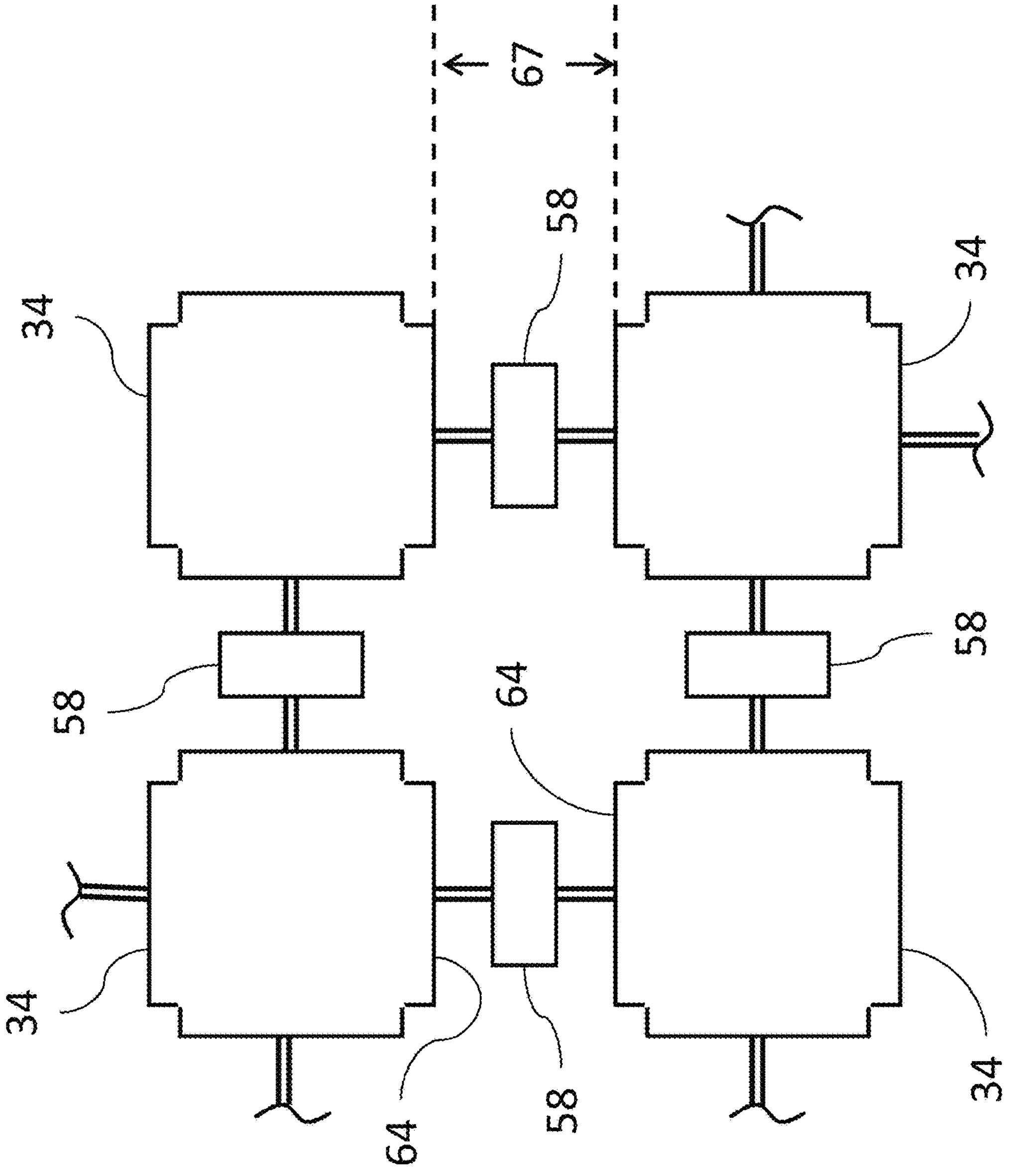
FIG. 5 is a plan view of an enlarged portion of the reflector of FIG. 2 showing capacitive loading according to devices herein.

Capacitive loading is added to the AMC reflector 31 to tune the antenna 10 for lower frequency response. Some, but not all, of the patches 34 are connected to each other with a capacitor 58. For example, capacitors added at a radius of approximately 30-60 mm improve the gain over the 1-2 GHz region. Capacitive loading at a radius of approximately 48-73 mm, improves the gain over the 0.7-1 GHz region. FIG. 5 shows an enlarged portion of FIG. 2, indicated by oval 61. Each patch may include a tab 64 on which to attach the capacitor 58. The length and width of the tab 64 may be optimized for frequency response and radiation pattern symmetry. In some exemplary embodiments, the gap 67 between tabs 64 may be approximately 6 mm and each capacitor may be rated at 0.6 pF.

Figure 6:
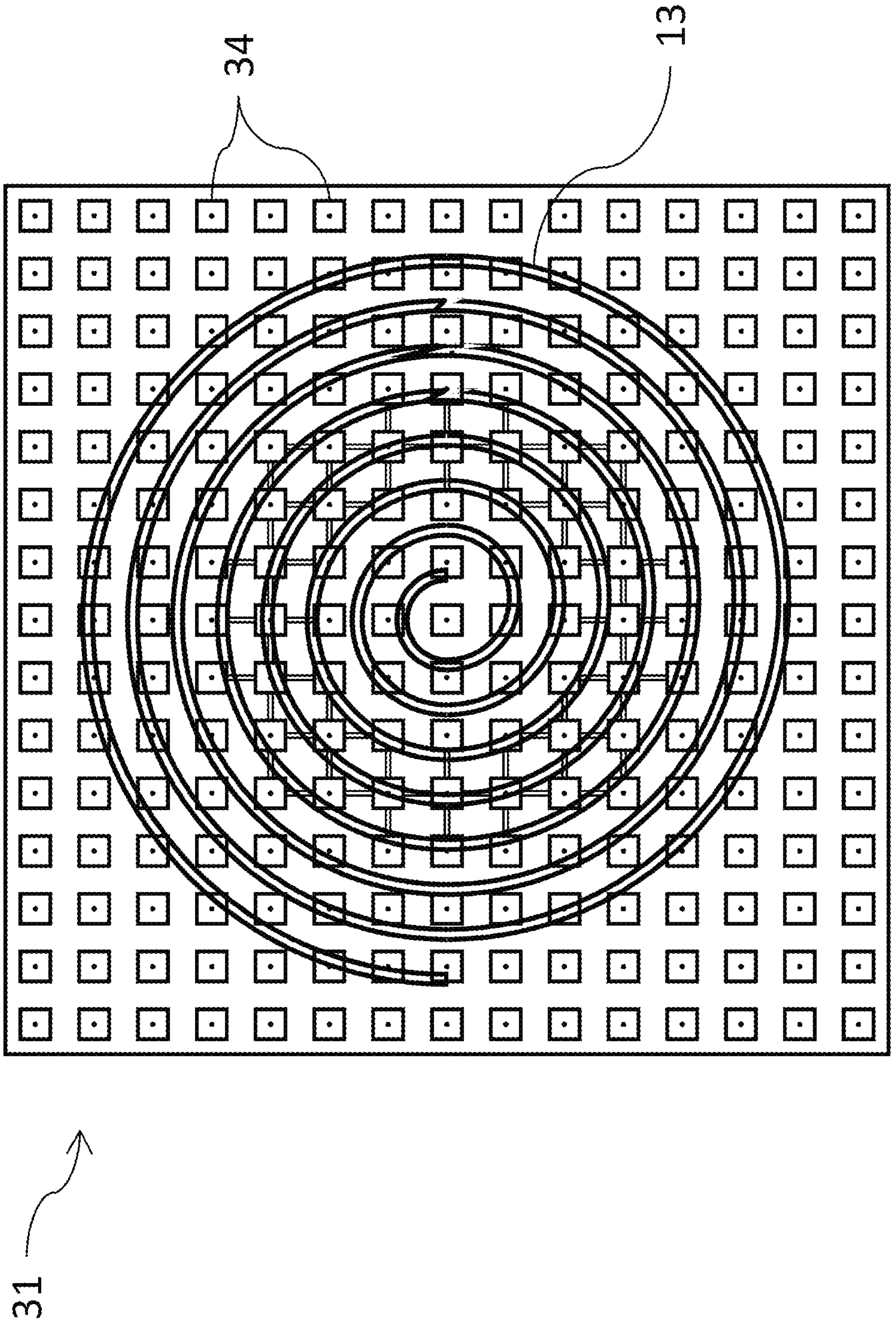
FIG. 6 is a plan view of an AMC reflector with a spiral antenna.

FIG. 6 shows a radiating element 13 and the AMC reflector 31. The top layer 49 (e.g., FR4 substrate), which is approximately 4 mm thick, is separated from the radiating element 13 by approximately 1 mm to alleviate coupling, and rests directly on the surface of the laminate structure 52 (e.g., Rogers RT/Duroid® 6180 laminate) which is approximately 9 mm thick. The ground plane reflector 40 is attached to the bottom of the laminate structure 52. This configuration results in a total reflector thickness of approximately 14 mm. The AMC reflector 31 is designed to reflect frequencies from 1-2 GHz using capacitively loaded square patches 34.

Figure 7:
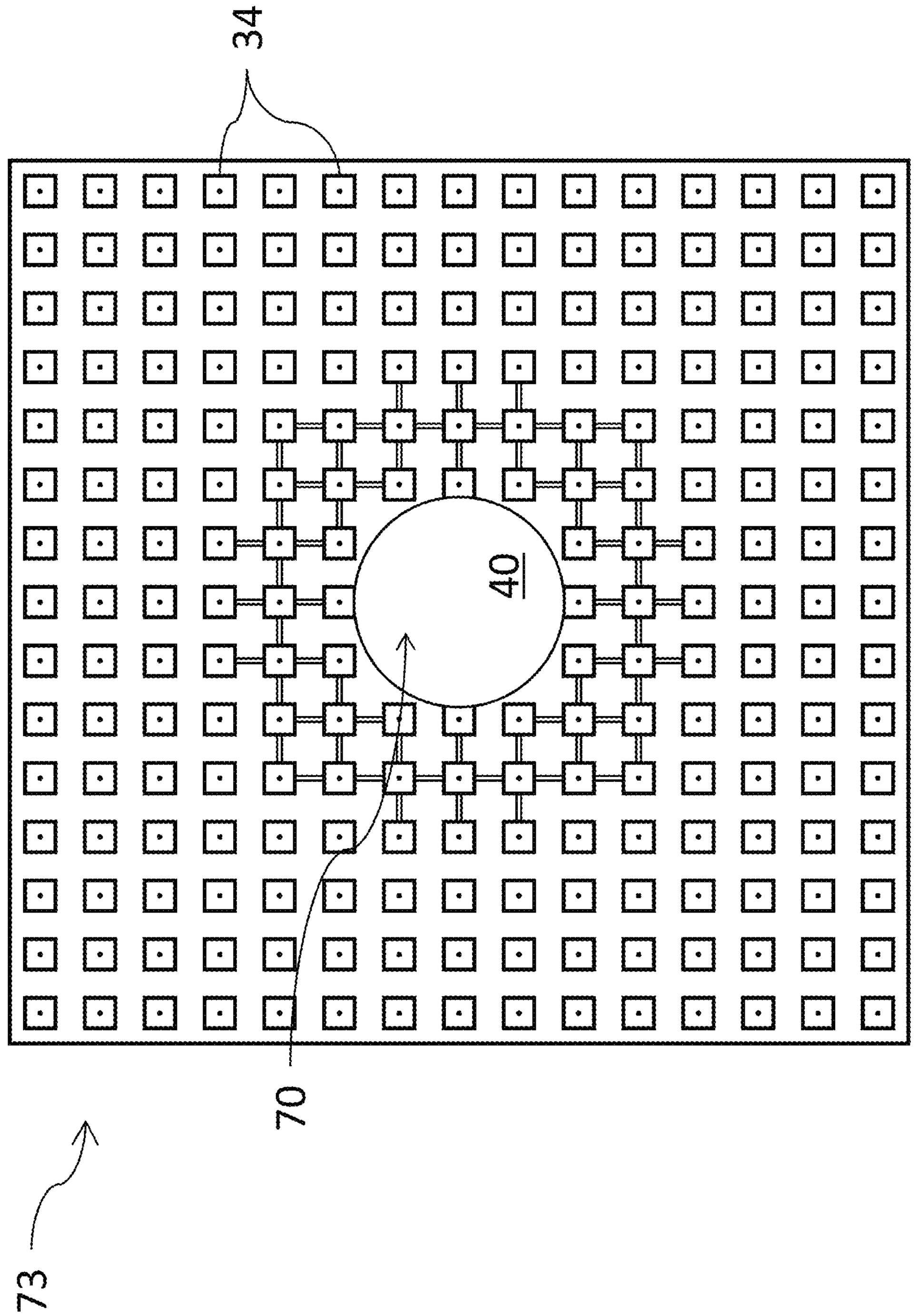
FIG. 7 is a plan view of a hybrid reflector according to devices herein.

To improve performance across all frequency bands, the center section 70, which corresponds to the high frequency section of the reflector, is removed. FIG. 7 shows a hybrid reflector 73 that combines the features of a PEC reflector and an AMC reflector. More specifically, the hybrid reflector 73 includes a traditional PEC reflector portion, used to reflect higher frequencies, and a capacitively loaded AMC reflector portion, used to reflect lower frequencies. The hollowed out circular center section 70 is the center, high frequency section of the AMC reflector 31, such that only the ground plane reflector 40 is available to supply a reflection surface for the 3-5 GHz frequencies. This provides an optimized 14 mm standoff distance from the radiating element 13 to the ground plane reflector 40, allowing direct reflection from the ground plane reflector 40. The 14 mm standoff distance corresponds to λ/4 at 5.3 GHz, which matches the thickness of the AMC portion of the hybrid reflector 73.

Figure 8:
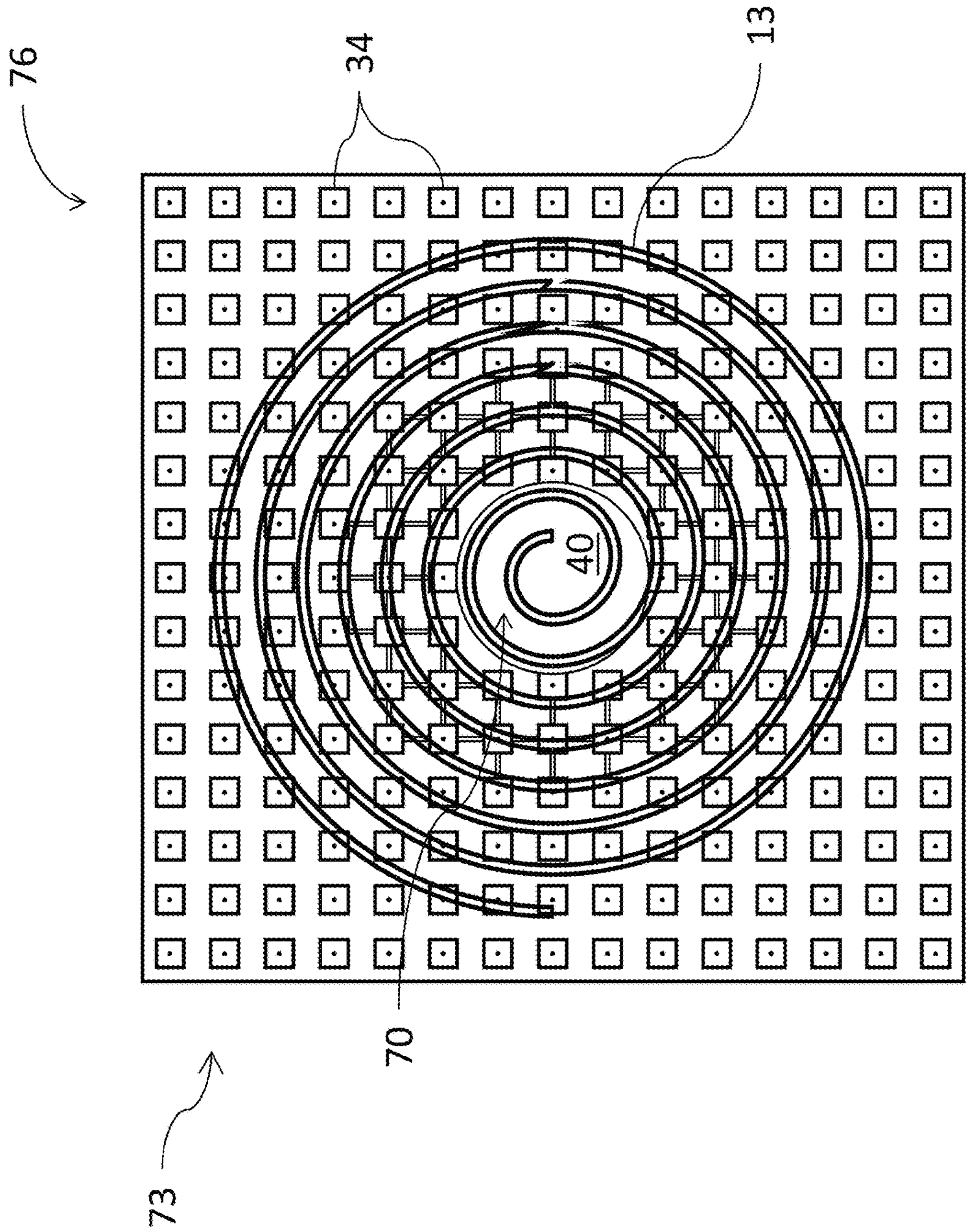
FIG. 8 is a plan view of a spiral antenna using a hybrid reflector according to devices herein.

FIG. 8 illustrates an antenna 76 having a spiral radiating element 13 and a hybrid reflector 73. The antenna 76 uses the hybrid reflector 73 to provide uni-directional antenna radiation over a 1-5 GHz frequency range. The hybrid reflector 73 may be approximately 288 mm×288 mm with 15 rows and 15 columns of square patches 34 sized approximately 15 mm on each side. The radius of the hollowed out center section 70 may be approximately 35 mm.

The hybrid reflector 73 uses the strengths of both the PEC and AMC surfaces to optimize reflected EM wave characteristics such as gain, directionality, and antenna patterns while minimizing the thickness of the reflector structure. As such, the hybrid reflector 73 provides 3 dB of additional gain over a 1-5 GHz frequency range indicating constructive interference of reflected EM waves. Additionally, the higher frequency antenna patterns are significantly improved over the PEC reflector alone and the reflector thickness has been reduced from 25 mm to 14 mm providing a lower profile antenna assembly. Both PEC reflector surfaces and AMC reflector surfaces have limited bandwidth. In order to minimize the thickness of the hybrid reflector 73, the PEC surface in the hollowed out center section 70 is used at the higher frequencies, 3-5 GHz, and the AMC surface is used at the lower frequencies, 1-2 GHz.

The invention has been described with references to specific embodiments. While particular values, relationships, materials, and steps have been set forth for purposes of describing concepts of the invention, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain exemplary embodiments and modifications of the concept underlying the present invention, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises", "comprising", "includes", and/or "including", when used in this specification, specify the presence of stated features, integers, steps, operations, elements, and/or components, but do not preclude the presence or addition of one or more other features, integers, steps, operations, elements, components, and/or groups thereof. Further, the terms "automated" or "automatically" mean that once a process is started (by a machine or a user) one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various embodiments herein have been presented for purposes of illustration but are not intended to be exhaustive or limited to the exemplary embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

For example, terms such as "right", "left", "vertical", "horizontal", "top", "bottom", "upper", "lower", "under", "below", "underlying", "over", "overlying", "parallel", "orthogonal", etc., as used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. An antenna reflector comprising:

a ground plane; and an artificial magnetic conductor surface comprising a plurality of patches on said artificial magnetic conductor surface and having a central portion removed to expose said ground plane, wherein some of the plurality of the patches are capacitively loaded around the central portion of the artificial magnetic conductor surface.

2. The antenna reflector according to claim 1, further comprising a laminate structure attached to the ground plane; and a layer containing said plurality of the patches on top of said laminate structure.

3. The antenna reflector according to claim 2 wherein the antenna reflector includes a total reflector thickness of approximately 14 mm.

4. The antenna reflector according to claim 1, wherein said patches are square.

5. The antenna reflector according to claim 4, wherein a portion of said patches include a tab to attach a capacitor between adjacent patches.

6. The antenna reflector according to claim 1, wherein said artificial magnetic conductor surface is capacitively loaded approximately 48-73 mm from the center of said ground plane.

7. The antenna reflector according to claim 1, wherein said removed central portion is circular.

8. The antenna reflector according to claim 7, wherein the circular central portion has a radius of approximately 35 mm.

9. The antenna reflector according to claim 1, wherein said antenna reflector comprises a square surface approximately 288 mm×288 mm with 15 rows and 15 columns of patches.

10. An antenna, comprising:

a substrate;

a feed element; and a radiating element being coupled to the feed element, wherein the radiating element is substantially parallel to said substrate, wherein said substrate comprises a dielectric material having a ground plane reflector and an artificial magnetic conductor reflector attached thereto, wherein said artificial magnetic conductor reflector is between said radiating element and said ground plane reflector, and wherein said artificial magnetic conductor reflector includes a central portion removed to allow direct reflection for said radiating element from said ground plane reflector.

11. The antenna according to claim 10, further comprising a transmitter being connected to said feed element, wherein said transmitter is configured to transmit at frequencies from 1-5 GHz.

12. The antenna according to claim 10, said radiating element comprising a spiral antenna.

13. The antenna according to claim 10, wherein said artificial magnetic conductor reflector comprises a plurality of patches connected to said ground plane.

14. The antenna according to claim 13, wherein said patches are square.

15. The antenna according to claim 13, wherein a portion of said patches include a tab to attach a capacitor between adjacent patches.

16. The antenna according to claim 10, wherein said artificial magnetic conductor reflector is capacitively loaded approximately 48-73 mm from the center of said ground plane.

17. The antenna according to claim 10, wherein said removed central portion is circular.

18. The antenna according to claim 17, wherein the circular central portion has a radius of approximately 35 mm.

19. The antenna according to claim 10, wherein said substrate comprises a square surface approximately 288 mm×288 mm with 15 rows and 15 columns of patches connected to said ground plane.

20. The antenna according to claim 10, wherein said substrate includes a thickness of approximately 14 mm.

* * * * *